Oct. 17, 1950 S. R. SHIELDS ET AL 2,526,288
FISHHOOK
Filed Sept. 11, 1948
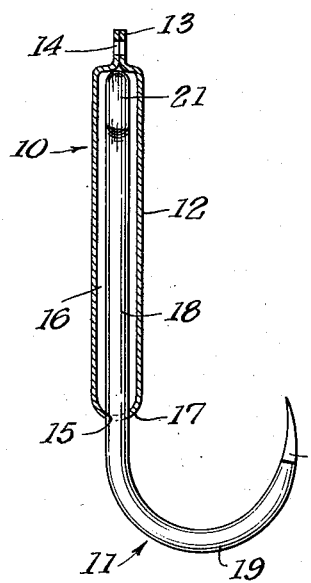
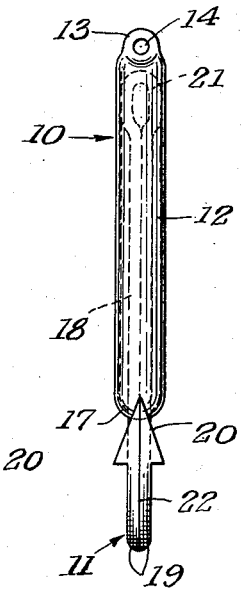
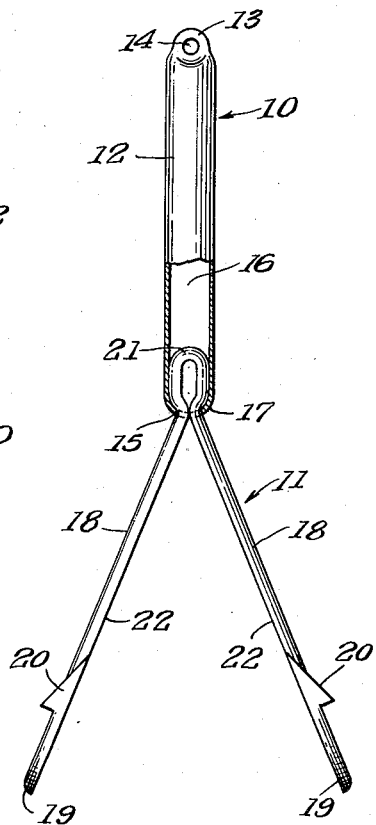
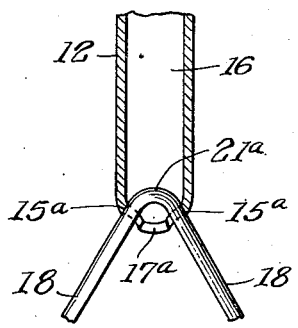
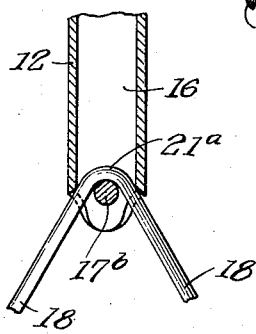
Inventors
STANLEY R. SHIELDS
By GEORGE JOHN KELLER
C. G. Stratton Attorney Patented Oct. 17, 1950

2,526,288

UNITED STATES PATENT OFFICE 2,526,288

FISHHOOK

Stanley R. Shields and George John Keller, Salt Lake City, Utah; said Keller assignor to Merwin H. Strange, Salt Lake City, Utah Application September 11, 1948, Serial No. 48,833

3 Claims. (Cl. 43—36)

This invention relates to fish hooks and has for one of its objects to provide a fish hook that has single hook visibility while serving as a lure and has multiple hook-holding power after a fish has "taken" the hook.

Another object of the invention is to provide a fish hook that has a collapsed or retracted position presenting a single barb, that automatically projects and expands in the mouth of a fish to form two barbs, increasing the holding power of said hook.

Another object of the invention is to provide a fish hook that automatically expands when taken by a fish and which is easily and safely restored to contracted position without the need for handling the barb thereof.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a longitudinal sectional view of a fish hook embodying features of the invention and shown in normal contracted position.

Fig. 2 is a front elevational view thereof.

Fig. 3 is a front elevational view, partly in section, showing the fish hook in extended position.

Figs. 4 and 5 are enlarged fragmentary longitudinal sectional views of modifications of the invention.

The present fish hook comprises, generally, a housing 10, and a hook 11 telescopically associated with the housing.

The housing 10 comprises an elongated tube 12 which, at its upper end is flattened to form an ear 13, the same having a hole 14 therethrough for connection to a fishline, snell, etc. As shown in Figs. 1 to 3, the lower end of the tube is provided with a preferably round opening 15 that is formed to be smaller than the interior 16 of the tube by inwardly directing the adjacent wall portions of the tube, or by crimping the same to provide an end abutment 17.

The hook 11 comprises similar but oppositely formed shanks 18 which are typically curved at 19 and each terminates in a barb 20. In practice, the hook 11 is integrally formed either of half-round suitably drawn and tempered spring wire, or of round wire that is split longitudinally. The first is preferred and illustrated in the drawing.

In the form of Figs. 1 to 3, the upper end of the shanks 18 are integrally connected by a bight 21 which is too large to pass through opening 15 but is freely slidable in the interior 16 of the tube. The flat faces 22 of the shanks are adapted to be in contact to provide the hook with a circular cross-section that is split. However, the hook is formed so that the shanks 18 normally seek a spread condition along the split as in Fig. 3, the spring of the material allowing the shanks to close to abutting position as in Fig. 2. Thus, when the shanks of the hook are retracted into the tube, as in Figs. 1 and 2, the wall of opening 15 holds them closed so that the two barbs 20 form one fish-hooking barb, and when the shanks are extended, as in Fig. 3, two separate barbs are presented by the spreading of the shanks.

In the modification of Fig. 4, the bight 21a connecting the shanks 18 comprises a simple bend in the length of the wire. Dissociation of the housing and fish hook is obviated by a crimp 17a between two holes 15a in the end of tube 12. The shanks pass through the holes 15a and the bight 21a is retained by crimp 17a.

In the form of Fig. 5, the lower end of tube 12 is left open and a cross-pin 17b is used to engage bight 21a to prevent dissociation of the housing and hook.

In each of the three forms shown, the hook, bight first, is slipped into the housing and the abutment 17, crimp 17a, or pin 17b, as the case may be, is formed or applied to give unity to the device.

The fish hook thus provided may be baited in the usual manner, or the tube 12 may be provided with prongs or the like for holding bait. In use, the fish hook is contracted to present a single barb to the fish, the same thus having single hook low visibility. When the fish strikes, he is impaled on this barb and in an attempt to get away, exerts a pull on the fish hook with relation to the housing. The shanks are freed to expand to the angular spread position now presenting two barbs each of which has substantially the fish-holding power of the initial barb. Both barbs should hold the fish securely hooked, and if one should pull free, the other would still hold the fish.

Removal of the fish from the hook is safe and simple. By simply holding the fish in one hand and the tube in the other, and pressing the tube further into the fish mouth, the shanks are again slid back into the tube and the barbs again brought together as they are released from the fish mouth. It will be understood that the shanks may normally have a wide spread and, when engaging a fish mouth, engage before full spreading occurs, thus creating a strong lateral force that directs the barbs to firmly hook.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described our invention, what we claim and desire to secure by Letters Patent is:

1. A fish hook comprising a tubular housing having an abutment at one end, and a hook of resilient material telescopically engaged in said housing and split to have two coextensive normally spread barb portions connected at their inner ends, said hook presenting a single fish-hooking barb when retracted into the housing and two spaced barbs when projected from said housing and engaged with the abutment.

2. A fish hook comprising a tubular housing having an abutment at one end, and a hook of resilient material telescopically engaged in said housing and split to provide similar shanks each terminating in a curved barbed end, said shanks being connected at their ends opposite the barbed ends and normally spaced apart, said housing, when the shanks are projected thereinto, holding the same together to present a single fish-hooking barb that comprises the barbed ends of the shanks, the shanks and the barbs therein assuming a spread condition angularly from their connected ends upon telescopic movement of said shanks outwardly from the housing to engage the connected ends with the abutment.

3. A fish hook comprising a tubular housing having an end abutment, and a normally retracted projectible hook of resilient material telescopically engaged in said housing, said hook comprising an integral length of spring wire formed with a central bend that engages said abutment when the hook is projected, the bend connecting similar shanks each terminating in a barb and normally spaced apart, said shanks thereby assuming a spread condition, when projected, to space the barbs thereon and being pressed together, when retracted, to bring the barbs together to form a single fish-hooking barb.

STANLEY R. SHIELDS.
GEORGE JOHN KELLER.

REFERENCES CITED

The following references are of record in the file of this patent:

UNITED STATES PATENTS

| Number | Name | Date |
| --- | --- | --- |
| 534,694 | Kienle | Feb. 26, 1895 |
| 1,717,190 | Coleman | June 11, 1929 |
| 1,774,539 | Ahlfors | Sept. 2, 1930 |